United States Patent
Webster et al.

(10) Patent No.: US 12,225,143 B2
(45) Date of Patent: Feb. 11, 2025

(54) TRACKING SUBSEA TELECOMMUNICATIONS ASSET CAPACITY AND SPECTRUM

(71) Applicant: Google LLC, Mountain View, CA (US)

(72) Inventors: Matthew Paul Webster, Hollister, CA (US); Sean Christopher Kurbanick, Santa Cruz, CA (US); Agnetha Garcia, Mountain View, CA (US)

(73) Assignee: Google LLC, Mountain View, CA (US)

( * ) Notice: Subject to any disclaimer, the term of this patent is extended or adjusted under 35 U.S.C. 154(b) by 252 days.

(21) Appl. No.: 17/812,116

(22) Filed: Jul. 12, 2022

(65) Prior Publication Data

US 2024/0022438 A1    Jan. 18, 2024

(51) Int. Cl.
*H04L 9/00* (2022.01)
*H04B 13/02* (2006.01)
*H04L 9/08* (2006.01)
*H04L 9/32* (2006.01)

(52) U.S. Cl.
CPC .............. *H04L 9/50* (2022.05); *H04L 9/0825* (2013.01); *H04L 9/3239* (2013.01); *H04B 13/02* (2013.01)

(58) Field of Classification Search
CPC ....... H04L 9/50; H04L 9/0825; H04L 9/3239; H04B 13/02
See application file for complete search history.

(56) References Cited

U.S. PATENT DOCUMENTS

| 2016/0164597 A1* | 6/2016 | Evans ................ H04J 14/0221 398/9 |
| 2019/0279204 A1 | 9/2019 | Norton et al. |
| 2019/0303888 A1* | 10/2019 | Hamasni .............. G06Q 20/401 |
| 2021/0097795 A1* | 4/2021 | Manchovski ......... H04L 63/108 |
| 2022/0263896 A1* | 8/2022 | Shah ..................... H04L 69/321 |
| 2022/0335417 A1* | 10/2022 | Regenor ............ G06Q 20/3678 |

(Continued)

OTHER PUBLICATIONS

Nandi Meghali, et al., A secured land registration framework on Blockchain, 2020 Third ISEA Conference on Security and Privacy (ISEA-ISAP), IEEE, Feb. 27, 2020, pp. 130-138, XP033764796, DOI: 10.1109/ISEA-ISAP49340.2020.235011, retrieved on Apr. 24, 2020, the whole document.

(Continued)

*Primary Examiner* — Jung W Kim
*Assistant Examiner* — Alan L Kong
(74) *Attorney, Agent, or Firm* — Honigman LLP; Brett A. Krueger

(57) ABSTRACT

A method includes generating a first asset token that represents control, by a first entity, of a portion of a physical communication asset. The method includes publishing, to a distributed ledger, ownership of the first asset token and receiving, from a second entity, a request to control the portion of the physical communication asset represented by the first asset token. In response to receiving the request, the method includes removing the first asset token from circulation on the distributed ledger and generating a second asset token representing control, by the second entity, of the portion of the physical communication asset. The method also includes publishing, to the distributed ledger, ownership of the second asset token and transferring, using the distributed ledger, ownership of the second asset token to the second entity.

18 Claims, 7 Drawing Sheets

(56) References Cited

U.S. PATENT DOCUMENTS

| | | | | |
|---|---|---|---|---|
| 2022/0358450 A1* | 11/2022 | Stephens | ............... | H04L 9/3213 |
| 2023/0061400 A1* | 3/2023 | Zukerman | ............... | G06F 30/15 |
| 2023/0073545 A1* | 3/2023 | Kurian | ................ | G06Q 20/401 |
| 2023/0104103 A1* | 4/2023 | Eby | ................... | G06Q 20/1235 |
| | | | | 705/69 |
| 2023/0166185 A1* | 6/2023 | Hiatt | ................... | H04L 9/3297 |
| | | | | 463/1 |

OTHER PUBLICATIONS

International Search Report and Written Opinion from the International Searching Authority for Internation Application No. PCT/US2023/027395 mailed Oct. 24, 2023.

\* cited by examiner

TRACKING SUBSEA TELECOMMUNICATIONS ASSET CAPACITY AND SPECTRUM

TECHNICAL FIELD

This disclosure relates to tracking subsea telecommunications asset capacity and spectrum.

BACKGROUND

A blockchain is a tamper-evident shared distributed digital ledger that records settlement and transaction processes in a defined public or private peer-to-peer network. Blockchains have built in efficiency of tracking, tracing, and management of records. Blockchains permanently record transactions via a sequential chain of cryptographic hash-linked "blocks." The history of transactions (e.g., asset exchanges) is distributed to some or all member nodes within the network. Each of the confirmed and validated transaction blocks are linked and chained sequentially from the beginning of the chain to the most current block (i.e., a blockchain). A blockchain thus acts as an instantaneous single source of truth for members.

SUMMARY

One aspect of the disclosure provides a method for tracking telecommunications asset capacity. The computer-implemented method, when executed by data processing hardware of a first entity, causes the data processing hardware to perform operations. The operations include generating a first asset token that represents control, by the first entity, of a portion of a physical communication asset. The first asset token includes information indicating an identity of the first entity and a location of the physical communication asset. The operations include publishing, to a distributed ledger, ownership of the first asset token and receiving, from a second entity, a request to control the portion of the physical communication asset represented by the first asset token. In response to receiving the request, the operations include removing the first asset token from circulation on the distributed ledger and generating a second asset token representing control, by the second entity, of the portion of the physical communication asset. The second asset token includes information indicating the identity of the first entity, an identity of the second entity, and the location of the physical communication asset. The operations also include publishing, to the distributed ledger, ownership of the second asset token and transferring, using the distributed ledger, ownership of the second asset token to the second entity.

Implementations of the disclosure may include one or more of the following optional features. In some implementations, the physical communication asset includes a subsea telecommunications asset and control of the portion of the physical communication asset includes controlling a respective portion of a bandwidth capacity of the subsea telecommunications asset. The second asset token may further include contractual information with a data encryption key. The contractual information may be associated with transferring control of the portion of the physical communication asset from the first entity to the second entity. In some of these examples, generating the second asset token includes generating the data encryption key, encrypting the contractual information with the data encryption key, and transferring the data encryption key to the second entity.

In some examples, the second asset token further includes an expiration and a smart contract, using the distributed ledger, automatically removes the second asset token from circulation upon expiration of the second asset token. Optionally, generating the first asset token includes signing the first asset token with a private encryption key associated with the first entity. Transferring ownership of the second asset token to the second entity may include transferring ownership of the second asset token to an address of the distributed ledger associated with a public encryption key of the second entity.

In some implementations, removing the first asset token from circulation on the distributed ledger includes transferring ownership of the first asset token to an address of the distributed ledger associated with an unknown private encryption key. In some examples, the operations further include generating a third asset token representing control, by a third entity, of a second portion of the physical communication asset different from the portion of the physical communication asset represented by the first asset token. In these examples, the operations further include publishing, to the distributed ledger, ownership of the third asset token and transferring, using the distributed ledger, ownership of the third asset token to the third entity. Optionally, the location of the physical communication asset includes a first end of a subsea communication cable and a second end of the subsea communication cable.

Another aspect of the disclosure provides a system for tracking telecommunications asset capacity. The system includes data processing hardware of a first entity and memory hardware in communication with the data processing hardware. The memory hardware stores instructions that when executed on the data processing hardware cause the data processing hardware to perform operations. The operations include generating a first asset token that represents control, by the first entity, of a portion of a physical communication asset. The first asset token includes information indicating an identity of the first entity and a location of the physical communication asset. The operations include publishing, to a distributed ledger, ownership of the first asset token and receiving, from a second entity, a request to control the portion of the physical communication asset represented by the first asset token. In response to receiving the request, the operations include removing the first asset token from circulation on the distributed ledger and generating a second asset token representing control, by the second entity, of the portion of the physical communication asset. The second asset token includes information indicating the identity of the first entity, an identity of the second entity, and the location of the physical communication asset. The operations also include publishing, to the distributed ledger, ownership of the second asset token and transferring, using the distributed ledger, ownership of the second asset token to the second entity This aspect may include one or more of the following optional features. In some implementations, the physical communication asset includes a subsea telecommunications asset and control of the portion of the physical communication asset includes controlling a respective portion of a bandwidth capacity of the subsea telecommunications asset. The second asset token may further include contractual information with a data encryption key. The contractual information may be associated with transferring control of the portion of the physical communication asset from the first entity to the second entity. In some of these examples, generating the second asset token includes generating the data encryption key, encrypting the contractual information with the data encryption key, and transferring the data encryption key to the second entity.

In some examples, the second asset token further includes an expiration and a smart contract, using the distributed ledger, automatically removes the second asset token from circulation upon expiration of the second asset token. Optionally, generating the first asset token includes signing the first asset token with a private encryption key associated with the first entity. Transferring ownership of the second asset token to the second entity may include transferring ownership of the second asset token to an address of the distributed ledger associated with a public encryption key of the second entity.

In some implementations, removing the first asset token from circulation on the distributed ledger includes transferring ownership of the first asset token to an address of the distributed ledger associated with an unknown private encryption key. In some examples, the operations further include generating a third asset token representing control, by a third entity, of a second portion of the physical communication asset different from the portion of the physical communication asset represented by the first asset token. In these examples, the operations further include publishing, to the distributed ledger, ownership of the third asset token and transferring, using the distributed ledger, ownership of the third asset token to the third entity. Optionally, the location of the physical communication asset includes a first end of a subsea communication cable and a second end of the subsea communication cable.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
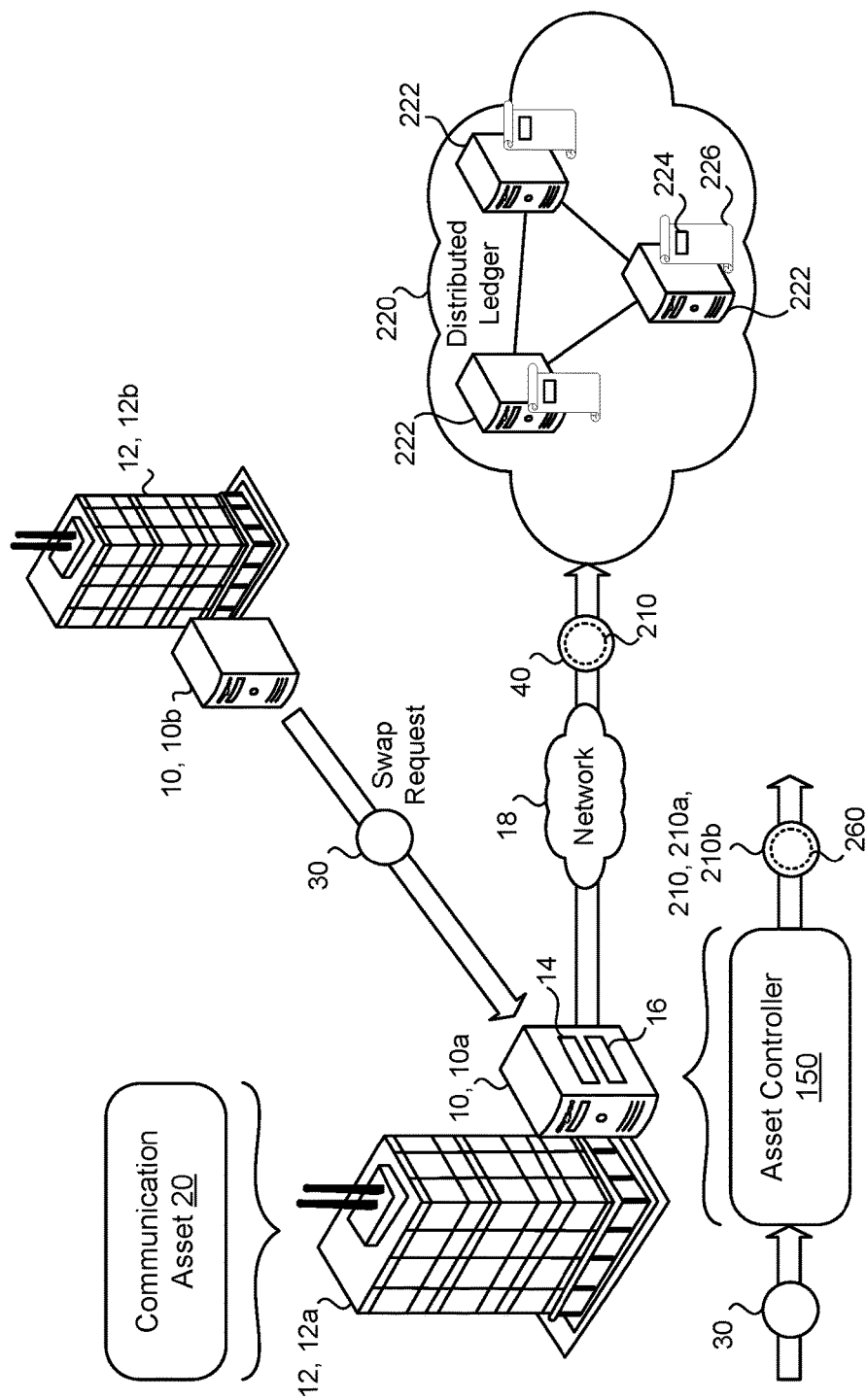
FIG. 1 is a schematic view of an example system for tracking telecommunications asset capacity.

Planning, permitting, negotiating, designing, and/or building some communication assets such as submarine cable capacity tends to be extremely expensive, time consuming, and important. Equally important is the verifiable management of the communication asset (e.g., optical transport capacity carried by submarine cable infrastructure). Tracking, tracing and monitoring, in real-time, of transfers and transactions of portions of the virtual circuits (i.e., "spectrum") between different and interested parties, post-installation of the infrastructure is desired.

Referring to subsea communications specifically, the ability for an island or continent to gain access to funding to build submarine cable infrastructure may be dictated by a series of political and business decisions where cost benefit evaluations are assessed based on the financial impact to large multinational companies. Historically, due to the prohibitive costs, submarine cables have been built by groups of telecommunications carrier companies who form a consortia to finance the construction of singular point to point cables. However, cables have long established lifespans, which are often extended with step-function upgrades telecommunications transportation line system upgrades. Additionally, new submarine cables attract interest and investment from multiple external private companies who see the potential to open new markets, deepen penetration, or increase resiliency of existing markets.

These companies look to capitalize on the profits that the extension of their own network's reach brings or to re-sell virtual or managed portions of their existing infrastructure to other smaller third party or wholesale companies via "swap" deals. Tracking overall capacity allocations in addition to these swap deals are typically an opaque, private, and difficult task reliant on personalized, tribal, and/or historical knowledge of deals and grandfathered arrangements as telecommunications companies become consolidated into other providers. These companies generally have very little formalized or centralized tracking mechanism for such swap capacity for submarine cables or other communication assets (e.g., terrestrial communications, wireless communications, etc.). The data tends to instead be disaggregated and unstructured. Moreover, due to the number of entities typically involved, a centralized authority to govern the data is difficult to implement.

A blockchain is a tamper-evident shared distributed digital ledger that records settlement and transaction processes in a defined public or private peer-to-peer network. Blockchains have built in efficiency of tracking, tracing, and management of records and permanently records transactions via a sequential chain of cryptographic hash-linked "blocks." The history of transactions (e.g., asset exchanges) is distributed to some or all member nodes within the network. Each of the confirmed and validated transaction blocks are linked and chained sequentially from the beginning of the chain to the most current block (i.e., a blockchain). A blockchain thus acts as an instantaneous single source of truth for members in a decentralized manner.

Implementations herein include an asset controller for tracking swap capacity for submarine cables and other communication assets (e.g., terrestrial and/or wireless communication assets). The asset controller tracks swap capacity in order to formalize and consolidate the dataset to make the information more transparent and help accelerate planning and negotiation efforts. The asset controller leverages a distributed ledger with both encrypted and unencrypted information to allow owners, partners, and third party participants to access appropriate data and enable each entity to track personal capacity interests in a decentralized manner without relying on any central authority.

Referring to FIG. 1, in some implementations, an example telecommunications asset capacity tracking system 100 includes a computing device 10, 10a. The computing device 10a may be a user device (e.g., a desktop workstation, a laptop workstation, or a mobile device or smart phone), a single computer (i.e., a server), multiple computers, or a distributed system (e.g., a cloud environment) having computing resources 14 (e.g., data processing hardware) and/or storage resources 16 (e.g., memory hardware).

The computing device 10a is controlled or operated by a first entity 12, 12a that owns or controls at least a portion of a physical communication asset 20. For example, the first entity 12a is a telecommunication business entity that owns, controls, and/or operates undersea telecommunication cables, terrestrial telecommunication cables, communication satellites, wireless broadband communication hardware, etc. and the respective portion of a bandwidth or spectrum capacity of these assets. The computing device 10a of the first entity 12a executes an asset controller 150 for tracking transactions swapping some or all of the control of the communication asset 20 with other entities 12.

The computing device 10a is configured to generate a first asset token 210, 210a that represents control and/or ownership of at least a portion of the communication asset 20. For example, as discussed in more detail below, the asset controller 150 signs the first asset token 210a with one or more keys 310 (FIG. 3) owned by the first entity 12a. The first asset token 210a may include additional information 260. In some examples, the information 260 includes an identity of the first entity 12a, a location of the communication asset 20 (e.g., a location of a first end of a cable and a location of a second end of a cable), and/or a description of the communication asset 20 (e.g., capabilities, age, manufacturer, etc.).

The asset controller 150 publishes (e.g., via a network 18) ownership of the first asset token 210a to a distributed ledger 220. The distributed ledger 220 (i.e., a shared ledger or distributed ledger technology) is a consensus of digital data replicated and synchronized across multiple nodes 222. The distributed ledger 220 lacks a central administrator or authority and instead relies on a consensus algorithm executed by at least a portion of the nodes 222 in a peer-to-peer network. The distributed ledger 220 may be a private distributed ledger or a public distributed ledger. The first asset token 210a, in some examples, is a non-fungible token (NFT) that the asset controller "mints" (i.e., creates or generates) by sending one or more transactions 40 to the distributed ledger 220. To own or control the first asset token 210a, the first asset token 210a is associated with an "address" that correlates to a private key 310PRK (FIG. 3) controlled by the first entity 12a. Some portion of the nodes 222 (e.g., a majority) validate the transaction 40, which causes the generation of a new block 224 which some or all of the nodes 222 store at independent ledgers or transaction logs 226. Each block 224 is timestamped and cryptographically signed, thus becoming unalterable without detection.

The asset controller 150 is also configured to receive swap requests 30 from other entities 12. Here, the asset controller 150 of the first entity 12a receives a swap request 30 from a second entity 12, 12b. The swap request 30 requests that the second entity 30b receive control of the portion of the communication asset 20 from the first entity 12a. For example, when the communication asset 20 is a subsea telecommunication cable, the swap request 30 may request control (i.e., use) of a portion of the capacity or bandwidth or spectrum of the cable. The swap request 30 may be a result from offline negotiations between the first entity 12a and the second entity 12b that generated contractual obligations for the first entity 12a and/or the second entity 12b. Additionally or alternatively, the swap request 30 is the result of a smart contract or decentralized application (dApp) executing on the peer-to-peer network of the distributed ledger 220.

When the first entity 12a acquiesces to the swap request 30, e.g., due to negotiations, contractual obligations, etc., the asset controller 150, in some implementations, removes the first asset token 210a from circulation on the distributed ledger 220 (i.e., "burns" the first asset token 210a). For example, the asset controller 150 sends a transaction 40 to the distributed ledger 220 to transfer ownership of the first asset token 210a to a cryptographic address associated with a private key unknown to any entity. This ensures that no entity can ever assert ownership over the first asset token 210a again.

The asset controller 150, in response to the swap request 30, generates a second asset token 210, 210b that represents control, by the second entity 12b, of the portion of the physical communication asset 20. The second asset token 210b may include some or all of the same information 260 as the first asset token 210a, such as the identity of the first entity 12a, the location of the communication asset 20, and/or a description of the communication asset 20. In some examples, the second asset token 210b includes additional information, such as an identity of the second entity 12b. The second asset token 210b, in some implementations, includes digital signatures (i.e., cryptographic signatures) from both the first entity 12a, the second entity 12b, and/or a neutral third party (e.g., a certificate authority or the like) to ensure the second asset token 210b represent a valid agreement between the first entity 12a and the second entity 12b.

The asset controller 150 publishes, to the distributed ledger 220, creation and/or ownership of the second asset token 210b and transfers, using a transaction 40 to the distributed ledger 200, ownership of the second asset token 210b to the second entity 12b. In this way, the second entity 12b can establish a right to control the portion of the communication asset 20 (as identified within the information 260 included with the second asset token 210b) by ownership of the second asset token 210b (i.e., by controlling the private keys associated with the "address" or public key the second asset token 210b is associated with) while simultaneously every other participant of the network may view the transaction history of the ledgers 226 to determine a current and historical status of the physical communication asset 20. For example, a different entity 12 may review the transaction history stored at one or more of the ledgers or logs 226 to determine that the communication asset 20 of interest is currently controlled by the second entity 12b.

Figure 2A:
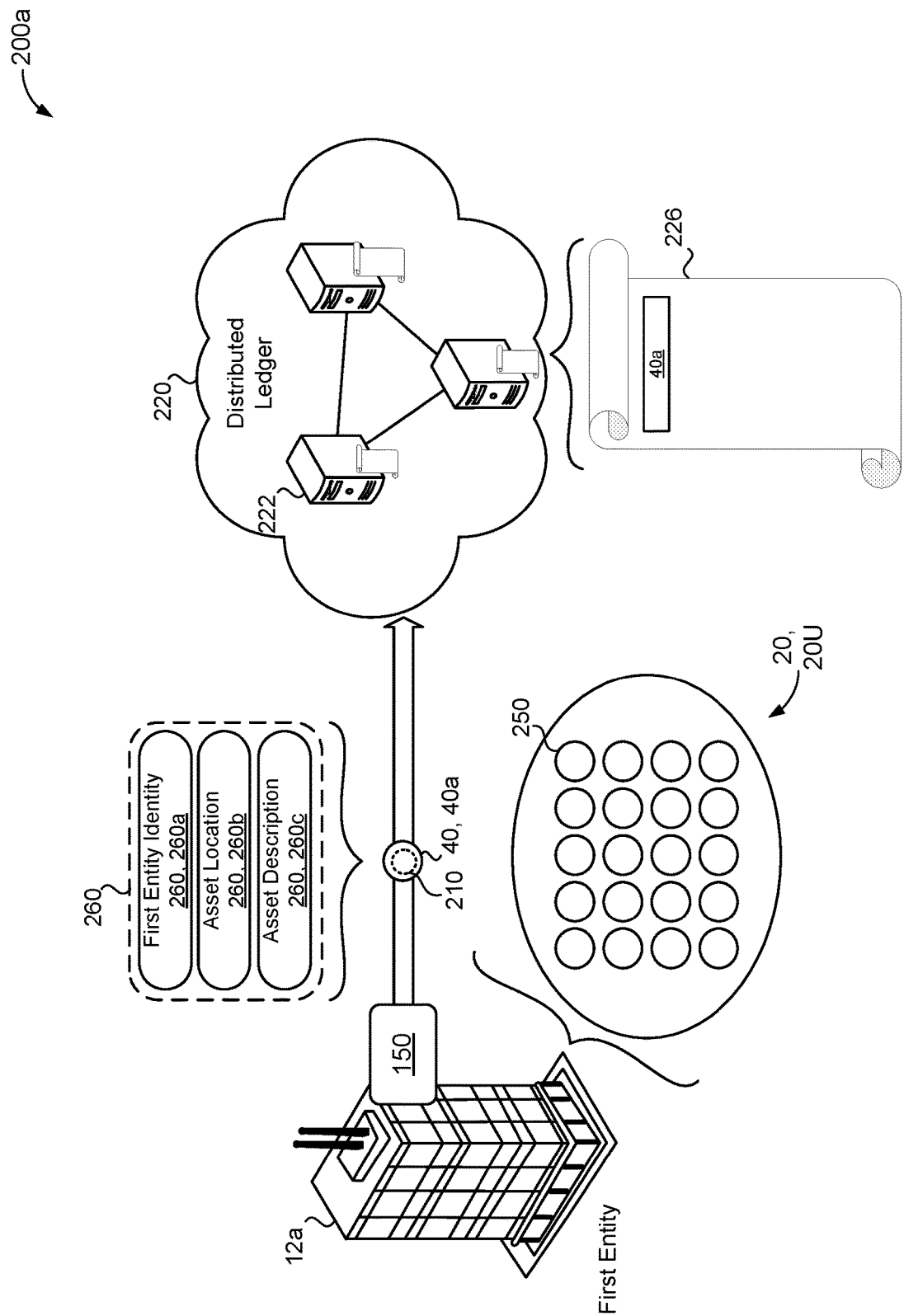
FIGS. 2A-C are schematic views of a second entity requesting control of a communication asset from a first entity.

Referring now to FIG. 2A, a schematic view 200a includes an example where the communication asset 20 is an undersea cable 20, 20U. In this example, the capacity of the undersea cable 20U is divided into twenty portions 250. That is, here, each portion 250 represents one-twentieth of the capacity of the undersea cable 20U. The first entity 12a may generate and publish any number of asset tokens 210 with each asset token 210 representing any sized portion 250 of the communication asset 20 depending on the granularity of the divisibility of the communication asset 20 the entity 12 desires. For example, here the first entity 12a generates twenty asset tokens 210 each representing one-twentieth of the capacity of the undersea cable 20U. That is, each asset token 210 represent one portion 250 of the capacity of the undersea cable 20U. Each portion 250 may be the same or different sizes. The asset controller 150 generates a transaction 40, 40a (or multiple transactions 40) to publish (i.e., mint) the twenty asset tokens 210 representing the portions 250 of the undersea cable 20U. Each asset token 210 includes corresponding information 260 for that respective asset token 260. Some of the information 260 may be the same for each asset token 210, such as an identity 260, 260a of the first entity 12a or an asset location 260, 260b of the undersea cable 20U. Other information 260 may differ among the asset tokens 210, such as an asset description 260, 260c that details a quantity of the capacity of the portion 250 of the undersea cable 20U that the respective asset token 210 represents. Subsequently, the nodes 222 of the distributed ledger 220 validate and record the transaction 40a to the ledger 226. According to the ledger 226, the first entity 12a has control or ownership over all twenty portions of the undersea cable 20U.

Figure 2B:
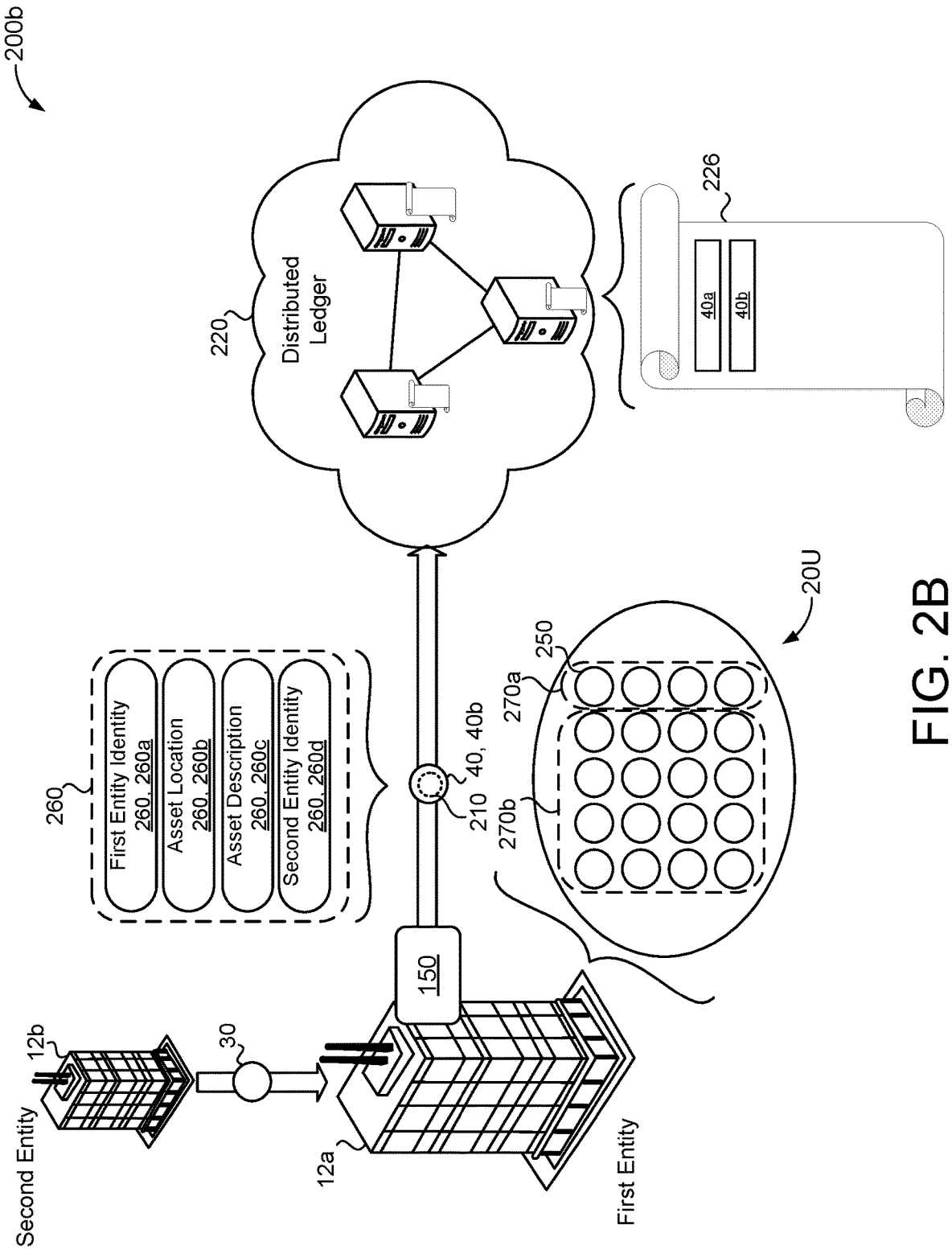

Referring now to FIG. 2B, a schematic view 200b continues the example of FIG. 2A. Here, the second entity 12b sends a swap request 30 to the first entity 12a requesting control to four portions 250 of the capacity of the undersea cable 20U. Here, the first entity 12a acquiesces to the request 30 and generates one or more asset tokens 210 that represent control over four portions 250 of the capacity of the undersea cable 20U. The first entity 12a publishes and transfers the asset tokens 210 to the second entity 12b in one or more transactions 40b to the distributed ledger 220. In this example, the information 260 of the asset tokens 210 includes the identity 260a of the first entity 12a, the location 260b of the communication asset 20, the description 260c of the communication asset 20, and an identity 260, 260d of the second entity 12b. While not shown here, the asset controller 150 may generate other transactions 40 to the distributed ledger 220 to facilitate the transfer (e.g., burning previous asset tokens 210).

Because ownership or control of each asset token 210 represents control over a corresponding portion 250 of the capacity of the undersea cable 20U, the second entity 12b can now verifiably demonstrate control over a first group 270a of four portions 250 of the capacity of the undersea cable 20U by demonstrating ownership of the corresponding asset tokens 210. The first entity 12a, after the transfer to the second entity 12b, is left with control over a second group 270b of sixteen portions 250 of the capacity of the undersea cable 20U. Using the transaction log 226 of the distributed ledger 220, the first entity 12a, the second entity 12b, and/or any other entity with access to the transaction log 226 may cryptographically verify that the first entity 12a transferred ownership of the asset tokens 210 representing control of portions 250 of the undersea cable 20U to the second entity 12b.

Figure 2C:
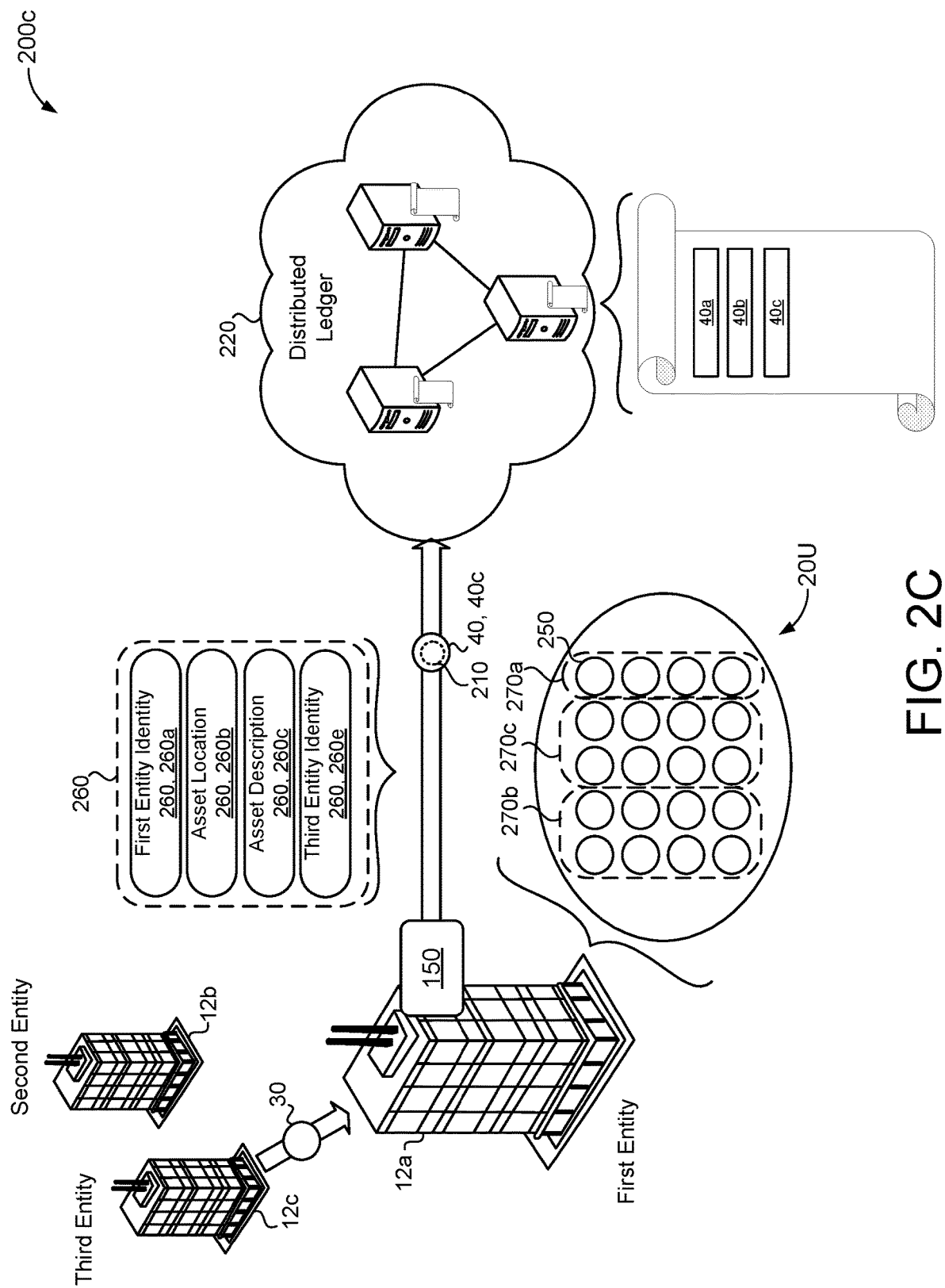

Referring now to FIG. 2C, a schematic view 200c continues the example of FIGS. 2A and 2B. Here, after the first entity 12a transfers ownership of the asset tokens 210 representing the first group 270a of portions 250 of the capacity of the undersea cable 20U, a third entity 12, 12c sends a swap request 30 to the first entity 12a. This swap request 30 requests control over eight of the portions 250 of capacity of the undersea cable 20U that the first entity 12a maintains control over. As with the request 30 from the second entity 12b (FIG. 2B), the asset controller 150 generates one or more asset tokens 210 that represent control over eight portions 250 of the capacity of the undersea cable 20U. The first entity 12a publishes and transfers the asset tokens 210 to the third entity 12c in one or more transactions 40c to the distributed ledger 220. In this example, the information 260 of the asset tokens 210 includes the identity 260a of the first entity 12a, the location 260b of the communication asset 20, the description 260c of the communication asset 20, and an identity 260, 260e of the third entity 12c. While not shown here, the asset controller 150 may generate other transactions 40 to the distributed ledger 220 to facilitate the transfer (e.g., burning previous asset tokens 210).

As discussed with the example of FIG. 2B, because ownership or control of each asset token 210 represents control over a corresponding portion 250 of the capacity of the undersea cable 20U, the third entity 12c can now verifiably demonstrate control over a third group 270c of four portions 250 of the capacity of the undersea cable 20U by demonstrating ownership of the corresponding asset tokens 210. The first entity 12a, after the transfer to the second entity 12b and the transfer to the third entity 12c, is left with control over the second group 270b of eight portions 250 of the capacity of the undersea cable 20U. Using the transaction log 226 of the distributed ledger 220, the first entity 12a, the second entity 12b, the third entity 12c, and/or any other entity with access to the transaction log 226 may cryptographically verify that the first entity 12a transferred ownership of the asset tokens 210 representing control of portions 250 of the undersea cable 20U to the third entity 12c.

In some examples, the third entity 12c (or any other entity 12) may acquire control of the first group 270a of the portions 250 from the second entity 12b. That is, the second entity 12b may also swap or exchange the portions 250 of the undersea cable 20U controlled by the second entity 12b (and received originally from the first entity 12a) to other entities 12. This may be accomplished via minting additional asset tokens 210 and sending the original and new asset tokens 210 to the new entity 12. In other examples, the original asset tokens 210 may be burned. Optionally, some or all of the entities involved may digitally sign the new asset tokens 210. Generating, transferring, and burning asset tokens 210 may be at least partially governed by one or more smart contracts 320 (FIG. 3) executing on the distributed ledger 220. For example, a first entity 12 sells capacity to a second entity (e.g., 4×20 units). The second entity may subsequently sub-lease smaller portions of that capacity to a third entity 12 (e.g., 1×20 units) and a fourth entity 12 e.g., (2×20 units) similar to how a consortium may divide a purchase of capacity into spectrum.

Figure 3:
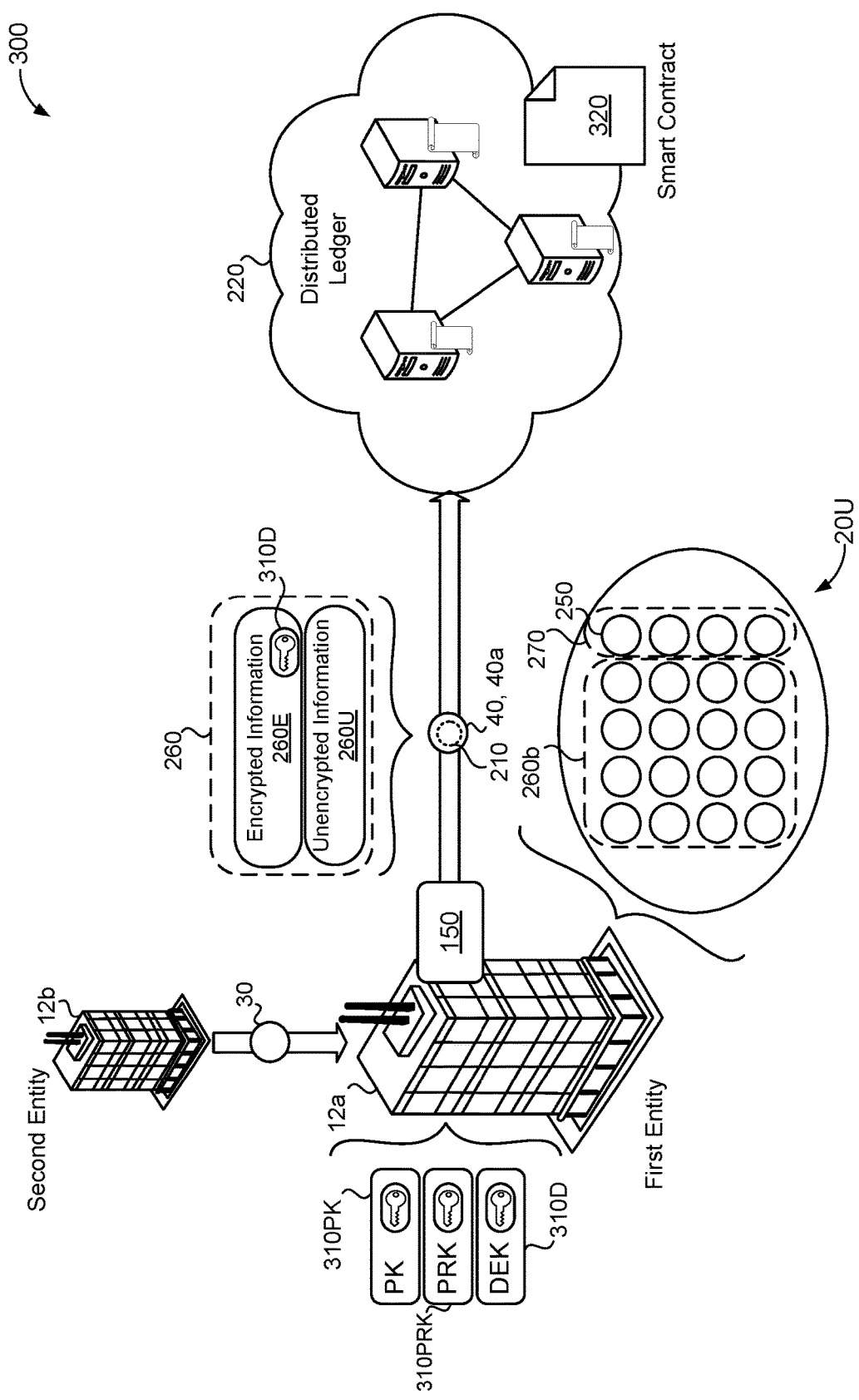
FIG. 3 is a schematic view of providing encrypted and unencrypted information in an asset token representing control of a communication asset.

Referring now to FIG. 3, a schematic view 300 illustrates an example, similar to FIG. 2B, where the second entity 12b, via a request 30, requests control of the first group 270a of portions 250 of capacity of the undersea cable 20U. In some implementations, the information 260 of the asset tokens 210 includes unencrypted information 260, 260U (such as the information 260 previously discussed like the identities of any involved entities 12, the location 260b of the communication asset 20, the description 260c of the communication asset 20, etc.) and encrypted information 260, 260E. The encrypted information 260E may include information 260 that is important to the transaction between the entities 12 but is too sensitive for public viewing. For example, the encrypted information 260E includes contractual information associated with transferring control of some or all of the communication asset 20, such as expiration/termination dates, transaction dates, financial details, termination conditions, etc. In these implementations, when the asset controller 150 generates the asset tokens 210, the asset controller 150 may also generate a data encryption key (DEK) 310D and encrypt any portion of the information 260 with the DEK 310D. The first entity 12a may share the DEK 310D with other authorized entities 12 that desire or require access to the encrypted information 260E while other entities 12 may only access the unencrypted information 260U (i.e., public information). In some examples, the DEK 310D is encrypted and included with the information 260. For example, the asset controller 150 encrypts the DEK 310D with a public key 310PK associated with an entity 12 authorized to access the encrypted information 260E. This allows the authorized entity 12 to access the encrypted information 260E of the access token 210 using a private key 310PRK associated with the corresponding public key 310PK. In other examples, the asset controller 150 transfers the DEK 310D to other entities 12 directly or uses a third-party key management service.

One or more entities 12 may digitally sign each asset token 210 with corresponding private key 310PRK to serve as authentication that the respective entity 12 acquiesces to the transfer of ownership of the portion(s) 250 of the communication asset 20. In the example of FIG. 3, the first entity 12a and the second entity 12b may each sign the asset token(s) 210 with respective private key 310PRK. Any entity 12 may subsequently verify the signature by using the corresponding public key 310PK of the respective entity 12.

In some implementations, the distributed ledger 220 executes one or more decentralized applications and/or smart contracts 320. In some of these implementations, the asset tokens 210 may include an expiration or other termination conditions. The smart contract 320, using the distributed ledger 220, may automatically remove an asset token 210 from circulation or revoke ownership of an asset token 210 upon expiration of the asset token 210 or upon any of the termination conditions triggering. For example, the smart contract 320 may monitor for payments or other transactions, and a lack of payment triggers revocation of ownership of the asset tokens 210 which reflects a loss of control over the communication asset 20.

Examples herein discuss transferring ownership of control over capacity of one or more undersea cables 20U, however the asset controller 150 may apply similar techniques to other communication assets, such as terminators, processing hardware, storage hardware, etc. and/or other telecommunication technologies such as terrestrial cable (e.g., fiber cable), satellite communication, and other wireless communication technologies.

Figure 4:
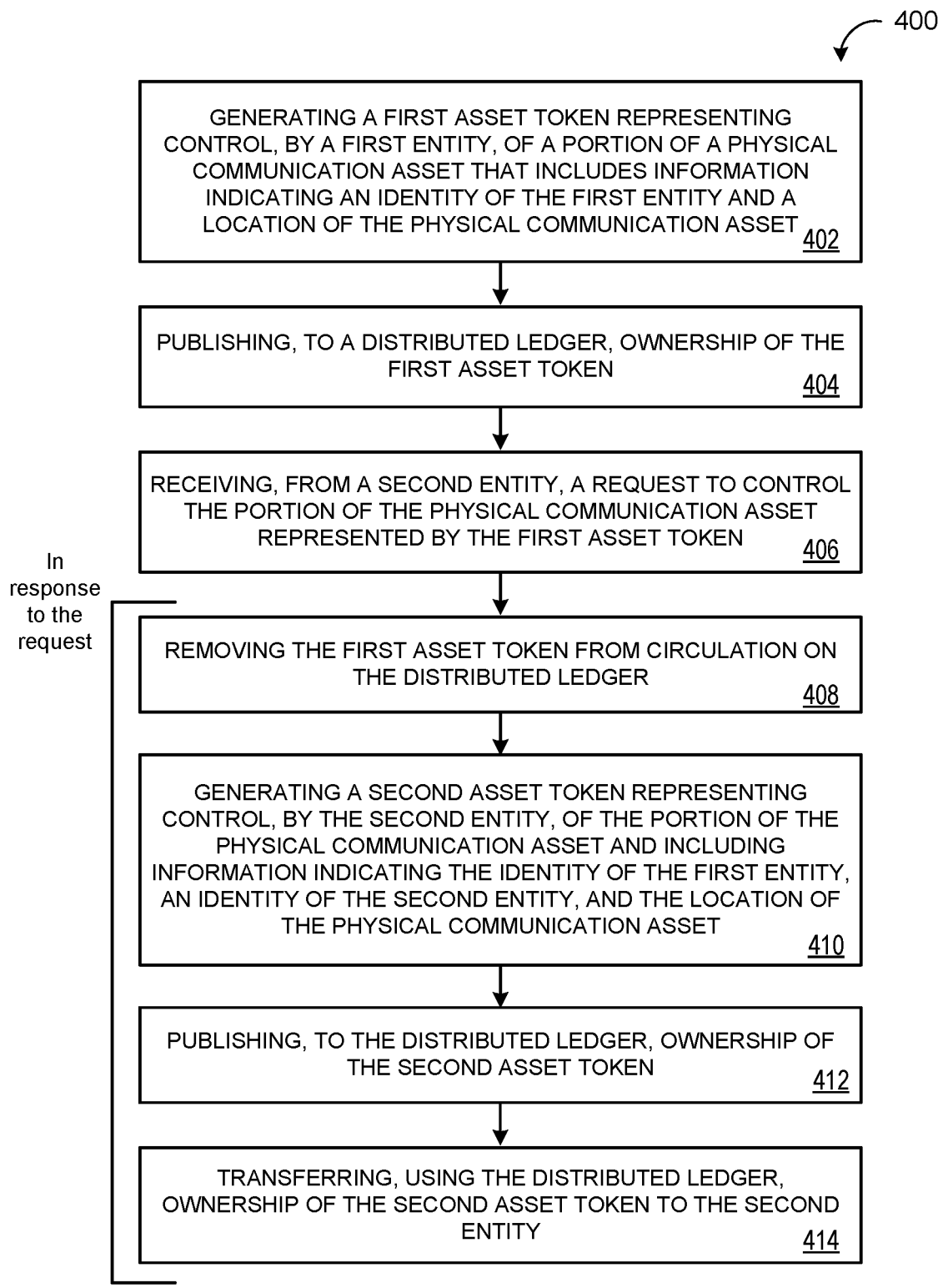
FIG. 4 a flowchart of an example arrangement of operations for a method for tracking telecommunications asset capacity.

FIG. 4 is a flowchart of an exemplary arrangement of operations for a method 400 for tracking telecommunications asset capacity. The computer-implemented method 400, when executed by data processing hardware 14 of a first entity 12a, causes the data processing hardware 14 to perform operations. The method 400, at operation 402, includes generating a first asset token 210 that represents control, by the first entity 12a, of a portion 250 of a physical communication asset 20. The first asset token 210 includes information 260 indicating an identity 260a of the first entity 12a and a location 260b of the physical communication asset 20. The method 400, at operation 404, includes publishing, to a distributed ledger 220, ownership of the first asset token 210 and, at operation 406, receiving, from a second entity 12b, a request 30 to control the portion 250 of the physical communication asset 20 represented by the first asset token 210. In response to receiving the request 30, the method 400, at operation 408, includes removing the first asset token 210 from circulation on the distributed ledger 220 and, at operation 410, generating a second asset token 210 representing control, by the second entity 12b, of the portion 250 of the physical communication asset 20. The second asset token 210 includes information 260 indicating the identity 260a of the first entity 12a, an identity 260d of the second entity 12b, and the location 260b of the physical communication asset 20. At operation 412, the method 400 includes publishing, to the distributed ledger 220, ownership of the second asset token 210 and, at operation 414, transferring, using the distributed ledger 220, ownership of the second asset token 210 to the second entity 12b.

Figure 5:
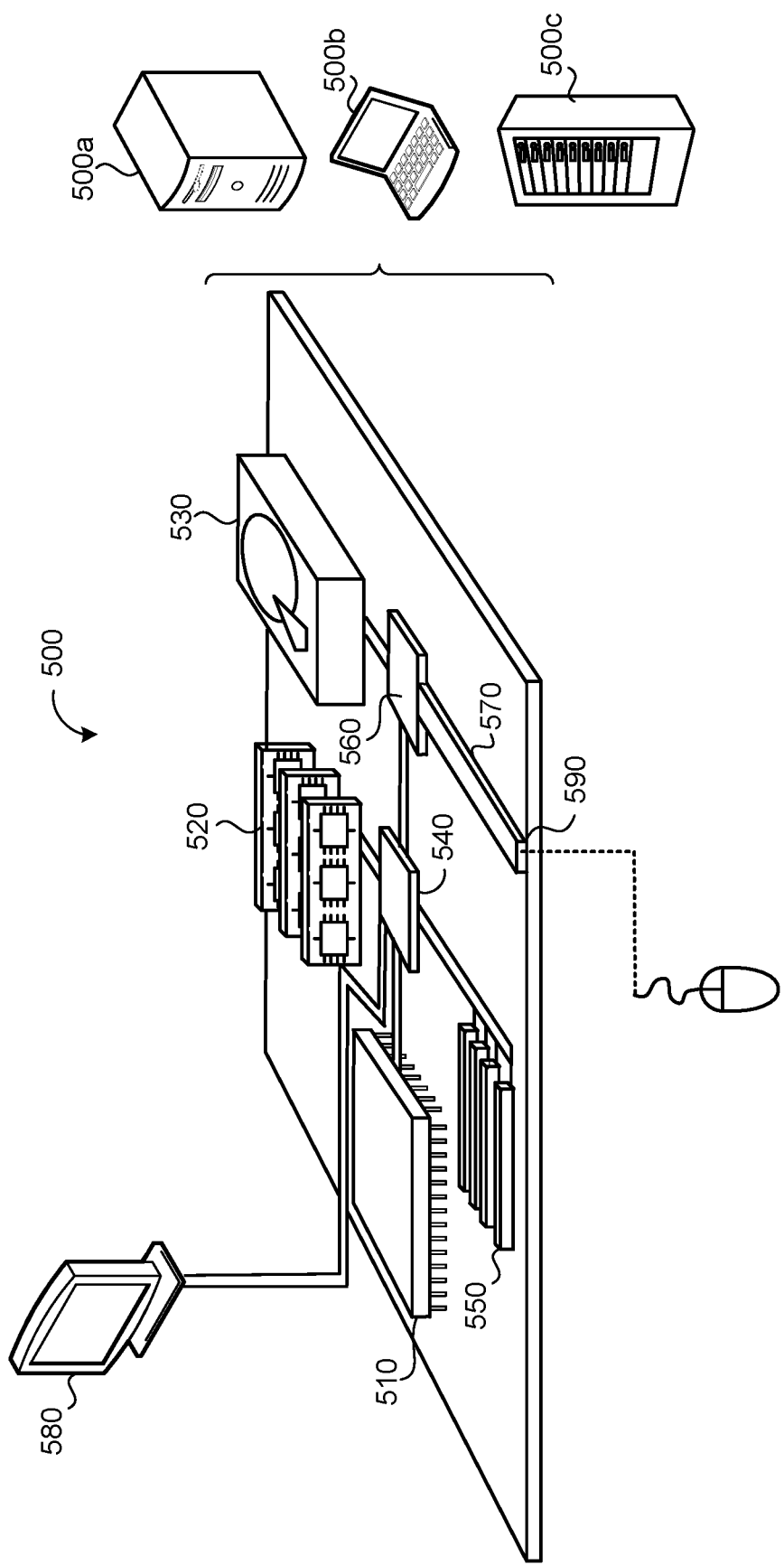
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:
1. A computer-implemented method executed by data processing hardware of a first entity that causes the data processing hardware to perform operations comprising:
   generating a first asset token, the first asset token representing control, by the first entity, of a portion of a physical communication asset, the first asset token comprising:
      an unencrypted identity of the first entity; and
      an unencrypted location of the physical communication asset;
   publishing, to a distributed ledger, ownership of the first asset token;
   receiving, from a second entity, a request to control the portion of the physical communication asset represented by the first asset token; and
   in response to receiving the request:
      removing the first asset token from circulation on the distributed ledger;
      generating a second asset token, the second asset token representing control, by the second entity, of the portion of the physical communication asset, the second asset token comprising:
         the unencrypted identity of the first entity;
         an unencrypted identity of the second entity;

the unencrypted location of the physical communication asset;
contractual information encrypted by a data encryption key, the contractual information associated with transferring control of the portion of the physical communication asset from the first entity to the second entity; and
the data encryption key encrypted by a public key associated with the second entity;
publishing, to the distributed ledger, ownership of the second asset token; and
transferring, using the distributed ledger, ownership of the second asset token to the second entity.

2. The method of claim 1, wherein:
the physical communication asset comprises a subsea telecommunications asset; and
control of the portion of the physical communication asset comprises controlling a respective portion of a bandwidth capacity of the subsea telecommunications asset.

3. The method of claim 1, wherein generating the second asset token comprises:
generating the data encryption key; and
encrypting the contractual information with the data encryption key.

4. The method of claim 1, wherein:
the second asset token further comprises an expiration; and
a smart contract, using the distributed ledger, automatically removes the second asset token from circulation upon expiration of the second asset token.

5. The method of claim 1, wherein generating the first asset token comprises signing the first asset token with a private encryption key associated with the first entity.

6. The method of claim 1, wherein transferring ownership of the second asset token to the second entity comprises transferring ownership of the second asset token to an address of the distributed ledger associated with a public encryption key of the second entity.

7. The method of claim 1, wherein removing the first asset token from circulation on the distributed ledger comprises transferring ownership of the first asset token to an address of the distributed ledger associated with an unknown private encryption key.

8. The method of claim 1, wherein the operations further comprise:
generating a third asset token, the third asset token representing control, by a third entity, of a second portion of the physical communication asset different from the portion of the physical communication asset represented by the first asset token;
publishing, to the distributed ledger, ownership of the third asset token; and
transferring, using the distributed ledger, ownership of the third asset token to the third entity.

9. The method of claim 1, wherein the location of the physical communication asset comprises:
a first end of a subsea communication cable; and
a second end of the subsea communication cable.

10. A system comprising:
data processing hardware of a first entity; and
memory hardware in communication with the data processing hardware, the memory hardware storing instructions that when executed on the data processing hardware cause the data processing hardware to perform operations comprising:
generating a first asset token, the first asset token representing control, by the first entity, of a portion of a physical communication asset, the first asset token comprising:
an unencrypted identity of the first entity; and
an unencrypted location of the physical communication asset;
publishing, to a distributed ledger, ownership of the first asset token;
receiving, from a second entity, a request to control the portion of the physical communication asset represented by the first asset token; and
in response to receiving the request:
removing the first asset token from circulation on the distributed ledger;
generating a second asset token, the second asset token representing control, by the second entity, of the portion of the physical communication asset, the second asset token comprising:
the unencrypted identity of the first entity;
an unencrypted identity of the second entity;
the unencrypted location of the physical communication asset;
contractual information encrypted by a data encryption key, the contractual information associated with transferring control of the portion of the physical communication asset from the first entity to the second entity; and
the data encryption key encrypted by a public key associated with the second entity;
publishing, to the distributed ledger, ownership of the second asset token; and
transferring, using the distributed ledger, ownership of the second asset token to the second entity.

11. The system of claim 10, wherein:
the physical communication asset comprises a subsea telecommunications asset; and
control of the portion of the physical communication asset comprises controlling a respective portion of a bandwidth capacity of the subsea telecommunications asset.

12. The system of claim 10, wherein generating the second asset token comprises:
generating the data encryption key; and
encrypting the contractual information with the data encryption key.

13. The system of claim 10, wherein:
the second asset token further comprises an expiration; and
a smart contract, using the distributed ledger, automatically removes the second asset token from circulation upon expiration of the second asset token.

14. The system of claim 10, wherein generating the first asset token comprises signing the first asset token with a private encryption key associated with the first entity.

15. The system of claim 10, wherein transferring ownership of the second asset token to the second entity comprises transferring ownership of the second asset token to an address of the distributed ledger associated with a public encryption key of the second entity.

16. The system of claim 10, wherein removing the first asset token from circulation on the distributed ledger comprises transferring ownership of the first asset token to an address of the distributed ledger associated with an unknown private encryption key.

17. The system of claim 10, wherein the operations further comprise:

generating a third asset token, the third asset token representing control, by a third entity, of a second portion of the physical communication asset different from the portion of the physical communication asset represented by the first asset token;

publishing, to the distributed ledger, ownership of the third asset token; and transferring, using the distributed ledger, ownership of the third asset token to the third entity.

18. The system of claim 10, wherein the location of the physical communication asset comprises:

a first end of a subsea communication cable; and a second end of the subsea communication cable.

* * * * *